United States Patent
Khafagy et al.

(10) Patent No.: US 10,995,721 B2
(45) Date of Patent: May 4, 2021

(54) SYSTEM AND METHOD FOR A STOP-START ENGINE

(71) Applicant: Ford Global Technologies, LLC, Dearborn, MI (US)

(72) Inventors: Hafiz Khafagy, Dearborn, MI (US); Hussam Makkiya, Dearborn, MI (US); Ahmed Awadi, Farmington Hills, MI (US); Gregory Ziemba, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 16/129,475

(22) Filed: Sep. 12, 2018

(65) Prior Publication Data

US 2020/0080527 A1    Mar. 12, 2020

(51) Int. Cl.
*F02N 11/00* (2006.01)
*F02N 11/08* (2006.01)

(52) U.S. Cl.
CPC .. *F02N 11/0822* (2013.01); *F02N 2200/0808* (2013.01)

(58) Field of Classification Search
CPC ............... F02N 11/0822; F02N 2200/0808
See application file for complete search history.

(56) References Cited

U.S. PATENT DOCUMENTS

| 8,788,178 | B2 | 7/2014 | Pebley et al. | |
|---|---|---|---|---|
| 10,487,790 | B1* | 11/2019 | Siddiqui | B60W 10/11 |
| 2007/0272187 | A1* | 11/2007 | Celisse | F02N 11/0833 123/179.4 |
| 2012/0185150 | A1* | 7/2012 | Horii | F02N 11/0822 701/102 |
| 2012/0330529 | A1* | 12/2012 | Pebley | F02N 11/084 701/101 |
| 2013/0197787 | A1* | 8/2013 | Urabe | B60W 10/20 701/112 |
| 2016/0069317 | A1* | 3/2016 | Koibuchi | F02D 17/04 701/112 |
| 2016/0229403 | A1* | 8/2016 | Khafagy | B60W 10/06 |
| 2016/0244056 | A1* | 8/2016 | Seguchi | B60W 10/06 |
| 2017/0203747 | A1* | 7/2017 | Khafagy | F02N 11/0803 |
| 2018/0080426 | A1* | 3/2018 | Kuramochi | B62D 5/005 |
| 2018/0223788 | A1* | 8/2018 | Gerty | F02N 19/004 |
| 2018/0339693 | A1* | 11/2018 | Kunihiro | B62D 15/0265 |
| 2019/0023256 | A1* | 1/2019 | Khafagy | B60W 20/10 |
| 2019/0217884 | A1* | 7/2019 | Siddiqui | B60W 30/18172 |

FOREIGN PATENT DOCUMENTS

WO    2015128728 A1    9/2015

* cited by examiner

*Primary Examiner* — Phutthiwat Wongwian
*Assistant Examiner* — Sherman D Manley
(74) *Attorney, Agent, or Firm* — Geoffrey Brumbaugh; McCoy Russell LLP

(57) ABSTRACT

Methods and systems are provided for adjusting a steering torque threshold for automatically stopping and starting a vehicle engine. In one example, a method may include, while the engine is running, determining a first steering torque threshold for inhibiting stop-start of the engine based on a steering wheel angle, and, while the engine is auto-stopped, determining a second steering torque threshold for inhibiting the stop-start based on the steering wheel angle and whether a static stop-start event is present or a rolling stop-start event is present. In this way, a non-linear hysteresis is provided for automatically stopping and starting the engine.

16 Claims, 5 Drawing Sheets

SYSTEM AND METHOD FOR A STOP-START ENGINE

FIELD

The present description relates to systems and methods for operating an engine that may be automatically stopped and started.

BACKGROUND/SUMMARY

A vehicle may include an engine that may be automatically stopped and started to conserve fuel, such as via a stop-start system. The engine may be stopped via a controller in response to vehicle operating conditions without receiving a specific request to stop the engine from a driver or occupant of the vehicle. Further, in response to other operating conditions, the controller may inhibit engine auto-stops and, if the engine is already auto-stopped, auto-start the engine. As one example, the vehicle may include an electric steering system, which may draw power to provide steering assistance to the driver for a steering maneuver. In order to provide steering assistance by the electric steering system and avoid draining a power source of the vehicle (e.g., a battery), the controller may inhibit engine auto-stops (and initiate auto-starts) based on an ability of the controller to anticipate a demand for steering assist by the driver. Overestimating the demand for steering assist may result in inhibiting engine auto-stops and initiating engine auto-starts more than needed to meet the steering assist demand of the driver. As a result, engine idle time is increased and fuel economy is decreased. Underestimating the demand for steering assist may result in providing insufficient steering assist for the driver demand, which may result in steering system hesitation and customer dissatisfaction.

Other attempts to address steering assist-based inhibition of engine stop-start functionality include inhibiting engine auto-stops (and initiating engine auto-starts) based on an amount of steering applied torque. One example approach is shown by Khafagy et al. in U.S. 2016/0229403 A1. Therein, the engine auto-stop function is inhibited in response to the amount of steering applied torque surpassing a predetermined steering torque threshold.

However, the inventors herein have recognized potential issues with such systems. As one example, the predetermined steering torque threshold is constant for the entire steering range, but the steering assist demand may vary based on an angle of the steering wheel. As a result, the constant steering torque threshold may produce a slow restart response at higher steering wheel angles, and the engine may be restarted prematurely at lower steering wheel angles. Further still, an amount of power drawn by the electric steering system for the same steering wheel angle may change based on vehicle conditions (e.g., vehicle speed, whether the engine is on or auto-stopped). Therefore, the steering assist demand may not be fully represented by the steering applied torque alone, which is not accounted for by using a single predetermined steering torque threshold across all stop-start conditions.

In one example, the issues described above may be addressed by a method comprising: while a vehicle engine is running, applying a first steering torque threshold, based on a steering wheel angle, for inhibiting engine stop-start; and while the engine is auto-stopped, applying a second steering torque threshold for inhibiting the engine stop-start, the second steering torque threshold based on the steering wheel angle and whether the engine is auto-stopped in a static stop-start status or a rolling stop-start status. In this way, the steering torque threshold is varied based on both the steering wheel angle and engine status (e.g., running, auto-stopped in a static stop-start, or auto-stopped in a rolling stop-start).

As one example, the static stop-start status is present when the engine is auto-stopped and a speed of the vehicle is less than or equal to a first threshold speed, and the rolling stop-start status is present when the engine is auto-stopped and the speed of the vehicle is greater than the first threshold speed and less than a second, higher threshold speed. As another example, each of the first steering torque threshold and the second steering torque threshold may be determined as a function of a pre-calibrated steering torque threshold and a decay rate, the decay rate determined as a function of the steering wheel angle, with a different pre-calibrated steering torque threshold used for the first steering torque threshold and the second steering torque threshold. In this way, the effect of vehicle conditions, such as vehicle speed, steering wheel angle, and engine status, may be accounted for in determining each of the first steering torque threshold and the second steering torque threshold.

As another example, in response to a steering applied torque that is greater than the first steering torque threshold while the engine is running or greater than the second steering torque threshold while the engine is auto-stopped, the stop-start of the engine may be inhibited, and in response to a steering applied torque that is less than the first steering torque threshold while the engine is running or less than the second steering torque threshold while the engine is auto-stopped, the stop-start of the engine may be enabled. For example, inhibiting the stop-start of the engine may include maintaining the engine on (when the engine is running) or restarting the engine (when the engine is auto-stopped), and enabling the stop-start of the engine may include auto-stopping the engine (when the engine is running) or maintaining the engine auto-stopped (when the engine is auto-stopped). Further, as the steering wheel angle increases, each of the first steering torque threshold and the second steering torque threshold may decrease. In this way, less steering applied torque may result in stop-start inhibition at higher steering wheel angles, enabling faster engine restarts (or preventing the engine from auto-stopping) at higher steering wheel angles and reducing premature engine restarts (or enabling the engine to auto-stop) at lower steering wheel angles compared with using a constant steering torque threshold. By accurately anticipating steering assist demand, engine idle time may be reduced and fuel economy may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
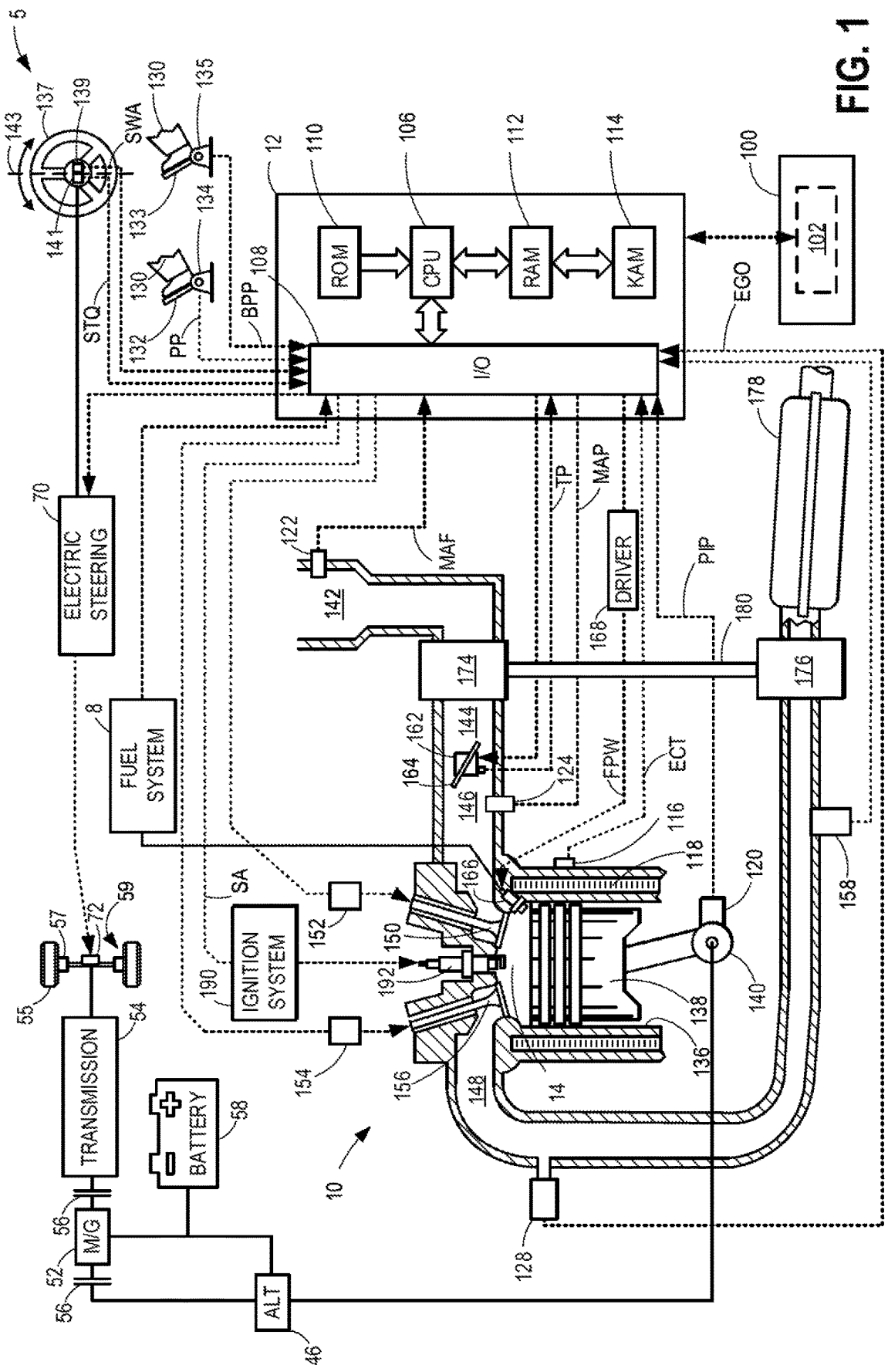
FIG. 1 shows a schematic depiction of an example vehicle system.
Figure 2A:
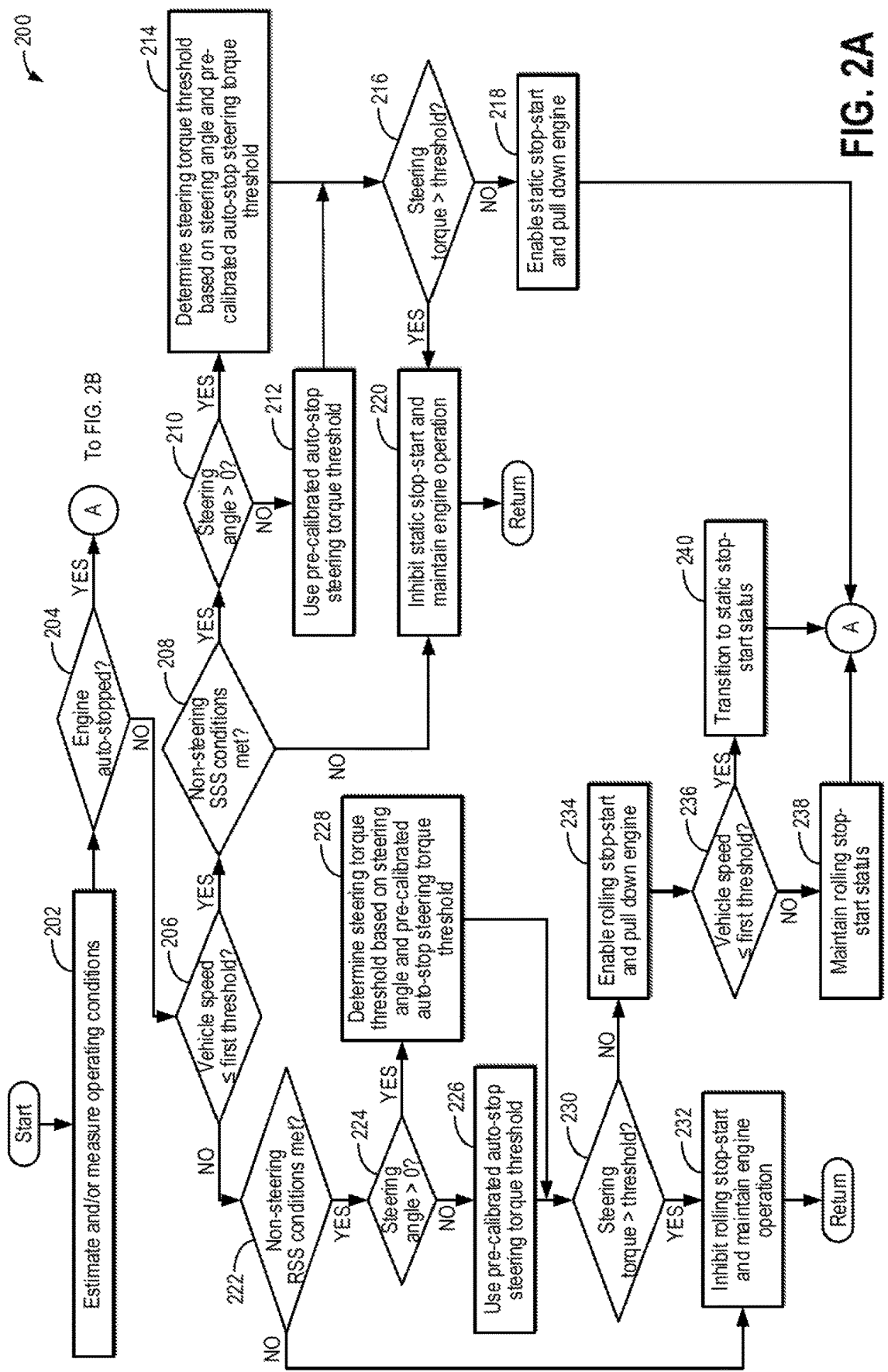
FIGS. 2A and 2B show an example method for determining a steering torque threshold for inhibiting auto start-stop of an engine and automatically stopping and starting the engine accordingly.
Figure 2B:
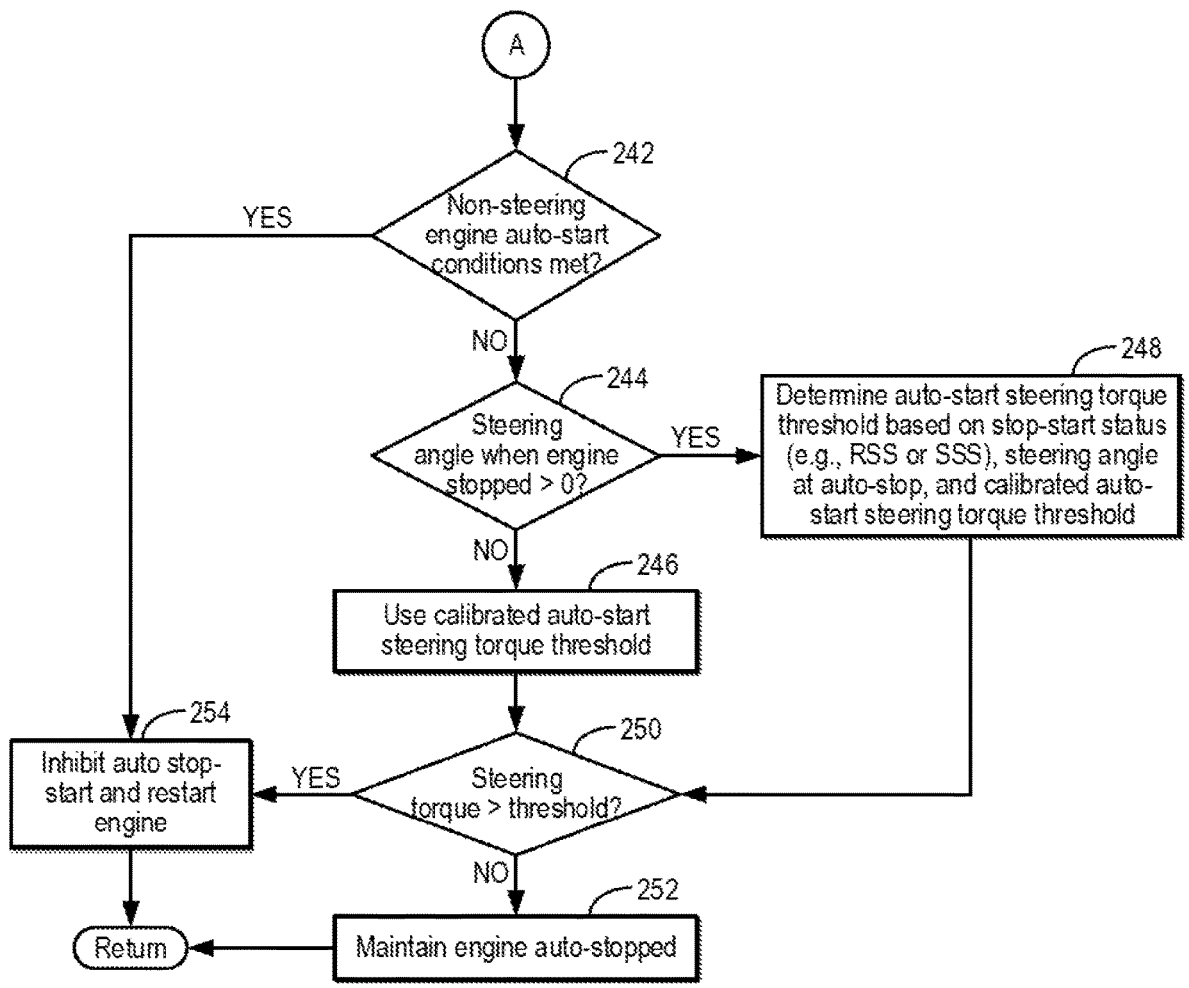
Figure 3:
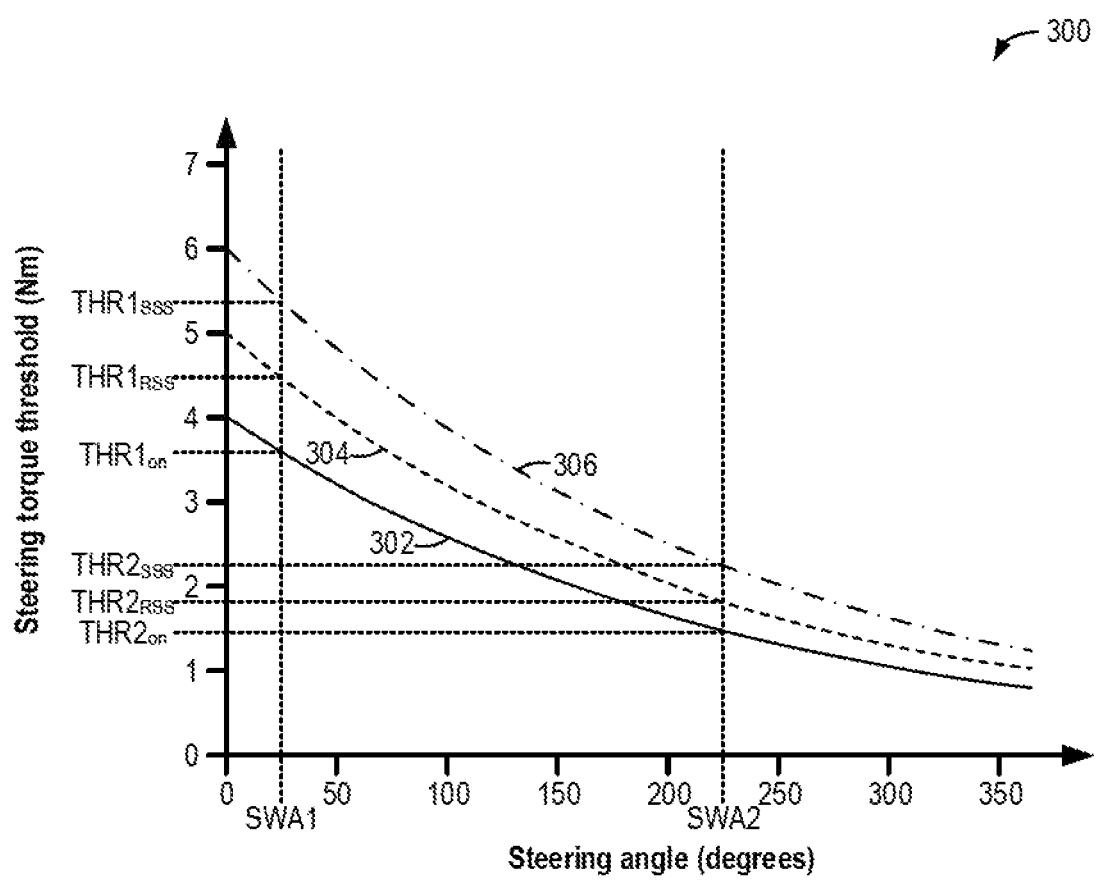
FIG. 3 shows an example graph of a relationship between steering wheel angle and steering torque threshold for different engine conditions (e.g., running, auto-stopped in a rolling stop-start, and auto-stopped in a static stop-start).
Figure 4:
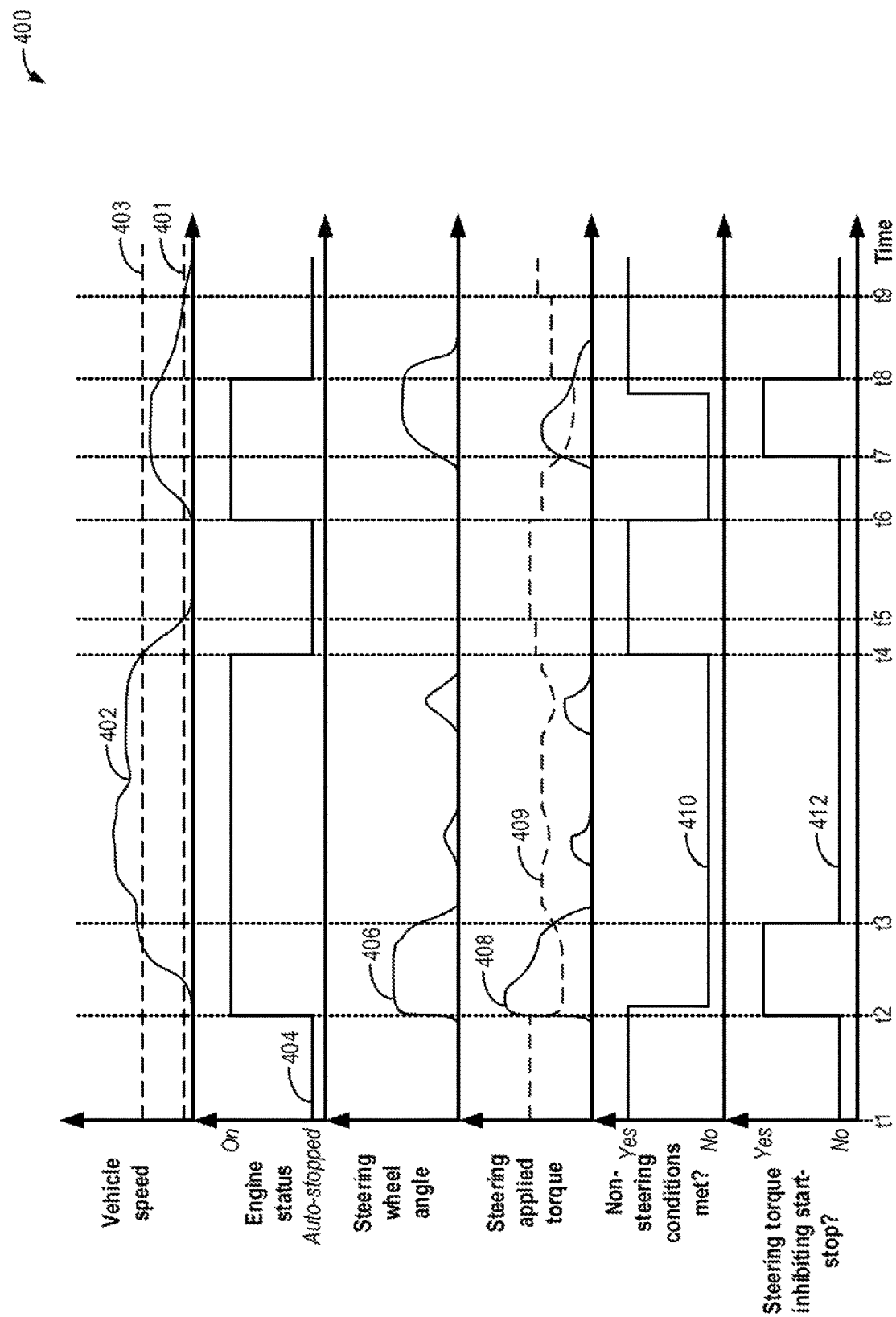
FIG. 4 shows a prophetic example timeline for automatically stopping and starting and an engine of a vehicle based on an amount of steering applied torque relative to a variable threshold.

The following description relates to systems and methods for operating an engine of a vehicle, such as the engine of the example vehicle depicted in FIG. 1, and adjusting a steering torque threshold that provides a basis for determining whether or not the engine may be automatically stopped and started (also referred to as "auto stop-start" herein). For example, the steering torque threshold may be adjusted according to the example method of FIGS. 2A-2B and may generally decrease as a steering wheel angle increases, such as according to a decay function. Further, different base, pre-calibrated steering torque thresholds may be used in determining the steering torque threshold based on whether the engine is running (e.g., with combustion occurring in engine cylinders), auto-stopped in a static stop-start event (e.g., without combustion occurring in engine cylinders and while the vehicle speed is less than or equal to a threshold speed), or auto-stopped in a rolling stop-start event (e.g., without combustion occurring in engine cylinders and while the vehicle speed is greater than the threshold speed). An example graph illustrating how the steering torque threshold varies with steering wheel angle is shown in FIG. 3 for each engine condition (running, auto-stopped in the static stop-start event, or auto-stopped in the rolling stop-start event). An example timeline for automatically shutting down and restarting the engine in response to the steering applied torque increasing above or decreasing below the steering torque threshold, respectively, is shown in FIG. 4. By adjusting the steering torque threshold based on the steering wheel angle and the engine condition, non-linear hysteresis is provided, providing for a greater tolerance to operator steering wheel movements at lower steering wheel angles than at higher steering wheel angles to more accurately inhibit auto stop-start than when the steering torque threshold is constant.

Turning now to the figures, FIG. 1 depicts an example embodiment of a cylinder 14 of an internal combustion engine 10, which may be included in a vehicle 5. Engine 10 may be controlled at least partially by a control system, including a controller 12, and by input from a vehicle operator 130 via an input device 132 to selectively propel vehicle 5. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Vehicle 5 may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46. Further, in some examples, system battery 58 may include one or more batteries, such as a primary battery and a secondary battery, in which one of the primary and secondary batteries is a traction battery and the other is a SLI battery.

Alternator 46 may be configured to charge system battery 58 using engine torque via crankshaft 140 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Vehicle wheels 55 may include a braking system 59, including brakes 57, to slow the rotation of vehicle wheels 55. Brakes 57 may be friction brakes, such as disc brakes or drum brakes, or electromagnetic (e.g., electromagnetically-actuated) brakes, for example. Braking system 59 may also include a braking unit that adjusts an amount of braking effort in response to an operator-requested braking event or a controller-initiated braking event. For example, during the operator-requested braking event, the vehicle operator 130 may depress a brake pedal 133. A brake pedal position sensor 135 may generate a proportional brake pedal position signal BPP, which may be used to determine the amount of braking effort requested by the vehicle operator. As the depression of brake pedal 133 increases, the amount of braking effort increases, for example. The amount of braking effort may include brake force and/or brake torque.

Vehicle 5 also includes an electric steering system 70 (also referred to herein as an "electric power assisted steering system," or EPAS system). In some examples, electric steering system 70 can turn vehicle wheels 55 directly in response to input from a steering wheel 137, as operated by the vehicle operator, or other steering input. In other examples, electric steering system 70 may provide electrical assistance to input from steering wheel 137. A steering motor 72 may adjust an angle of vehicle wheels 55 and may be controlled via electric steering system 70. System battery 58 and/or alternator 46 may provide electrical power to electric steering system 70, for example. A steering wheel angle (SWA) sensor 139 may be coupled to steering wheel 137 to provide a relative SWA signal to controller 12. That is, the relative SWA signal provides an indication of an angle of steering wheel 137 relative to a centered position 143 or relative to an angle of the steering wheel detected at vehicle startup. In some examples, an absolute SWA may be output by SWA sensor 139, or an absolute SWA may be determined based on the relative SWA signal. Further, a steering torque sensor 141 may be coupled to steering wheel 137 to output an amount of steering applied torque (e.g., signal STQ) to controller 12. The amount of steering applied torque, as measured by steering torque sensor 141, may be used by electric steering system 70 to assist in steering maneuvers and may be further used by controller 12 for enabling or inhibiting stop-start functionality of engine 10, as will be further described below with respect to FIGS. 2A-2B. As an example, an amount of assistive torque provided by steering motor 72 may be determined and produced in response to an input steering wheel angle (from SWA sensor 139) and an input steering applied torque (as measured by steering torque sensor 141). The amount of assistive torque and the resulting current draw by the electric steering system varies such that as the amount of assistive torque increases, the current drawn (or power consumed) increases.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine, and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof. In the example of FIG. 1, emission control device 178 is a three-way catalyst configured to reduce NOx and oxide hydrocarbons and CO.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. In other examples, spark may be provided at a timing retarded from MBT to maintain a spark-based torque reserve, such as during part-load operation. Controller 12 may input engine operating conditions, including engine speed, engine load, and exhaust gas AFR, into a look-up table and output a corresponding spark timing for the input engine operating conditions.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternative example, fuel injector 166 may be arranged in intake passage 146 rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Furthermore, vehicle 5 may include a start-stop system 100. Start-stop system 100 may comprise a controller 102 configured to determine when to auto-stop (e.g., pull down) and auto-start (e.g., pull up) engine 10 during vehicle operation, such as when a pre-determined start-stop condition is satisfied. As an example, controller 102 may be configured to autonomously shut down engine 10 while engine 10 is idling and vehicle 5 is stationary, in what is referred to herein as a static stop-start (SSS). As another example, additionally or alternatively, controller 102 may be configured to autonomously shut down engine 10 while engine 10 is idling and vehicle 5 is in motion, in what is referred to herein as a rolling stop-start (RSS). Once the engine is auto-stopped, controller 102 may restart engine 10 in response to a torque request from vehicle operator 130. Additional conditions for performing auto-stops and auto-stops will be described below with respect to FIGS. 2A-2B. Controller 102 may be a dedicated controller of start-stop system 100 that is communicatively coupled to controller 12. Alternatively, controller 102 may be omitted, and controller 12 may be configured to determine when to shut down and restart engine 10, for example. In still other examples, controller 102 may be included in another engine control unit or powertrain control module that is communicatively coupled to controller 12.

Controller 12 receives signals from the various sensors of FIG. 1 and employs the various actuators of FIG. 1 to adjust engine operation based on the received signals and instructions stored on a memory of the controller. For example, controller 12 and/or controller 102 may receive signal SWA from SWA sensor 139 and signal STQ from steering torque sensor 141 and enable or inhibit auto stop-starts by stop-start system 100 based on the received SWA and STQ signals, as further described below with respect to FIGS. 2A-2B.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

As mentioned above, steering applied torque may trigger engine restarts (and inhibit auto-stops) due to a current or anticipated power demand by an electric steering system. However, the power demand may vary based on vehicle speed and the steering wheel angle. Therefore, FIGS. 2A and 2B show an example method 200 for determining and using a steering torque threshold (e.g., a threshold amount of torque applied to a steering wheel, such as steering wheel 137 shown in FIG. 1) for enabling or inhibiting auto stop-start of a vehicle engine, such as engine 10 of vehicle 5 shown in FIG. 1, while the vehicle is operated. The steering wheel may be coupled to an EPAS system, such as EPAS system 70 of FIG. 1. In particular, the steering torque threshold may be adjusted based on whether the engine is on and operating or auto-stopped, whether a static stop-start or a rolling stop-start is enabled, and an angle of the steering wheel (e.g., as measured by SWA sensor 139 of FIG. 1) such that nonlinear hysteresis is employed throughout the steering range. Instructions for carrying out method 200 and the rest of the methods included herein may be executed by a controller (e.g., controller 12 and/or controller 102 of FIG. 1) based on instructions stored on a memory of the controller and in conjunction with signals received from sensors of the engine system, such as the sensors described above with reference to FIG. 1 (e.g., SWA sensor 139 and steering torque sensor 141 of FIG. 1). The controller may employ engine actuators of the engine system (e.g., fuel injector 166 of FIG. 1) to adjust engine operation according to the methods described below.

Referring to FIG. 2A, method 200 begins at 202 and includes estimating and/or measuring operating conditions. Operating conditions may include, for example, vehicle speed, a state of charge (SOC) of a system battery (e.g., system battery 58 of FIG. 1), engine status (e.g., on, with combustion occurring in engine cylinders, or off, without combustion occurring in engine cylinders), engine load, engine temperature, engine speed, torque demand, a brake value of a brake system (e.g., brake system 59 of FIG. 1), steering wheel angle, and steering applied torque. The operating conditions may be directly measured or inferred based on available data. As one example, the brake value may correspond to a value of displacement (e.g., a position) of a brake pedal (e.g., brake pedal 133 of FIG. 1), such as measured by a brake pedal position sensor (e.g., brake pedal position sensor 135 of FIG. 1). The steering wheel angle may be measured by the steering wheel angle sensor, and the steering applied torque may be measured by the steering torque sensor. Furthermore, as method 200 is executed, the operating conditions may be continuously assessed and updated as the operating conditions change.

At 204, method 200 includes determining if the engine is auto-stopped. For example, the engine may be auto-stopped by the controller in response to stop-start conditions being met, as will be further described below. Thus, if the engine is auto-stopped, the engine is off, and combustion does not occur in the engine cylinders (e.g., fuel is not delivered by the fuel injectors). If the engine is auto-stopped, method 200 proceeds to 242 (shown in FIG. 2B), as will be described below. If the engine is not auto-stopped (e.g., the engine is operating at a non-zero speed, with fuel provided by the fuel injectors and combustion occurring in engine cylinders), method 200 proceeds to 206 and includes determining if the vehicle speed is less than or equal to a first, lower threshold speed. The first threshold speed may be a non-zero vehicle speed that differentiates a static stop-start (SSS), where the engine is auto-stopped while the vehicle is not (or very slowly) moving, from a rolling stop-start (RSS), where the engine is auto-stopped while the vehicle remains in motion. For example, at vehicle speeds is less than or equal to the first threshold speed, a static stop-start may be utilized (in response to additional conditions for performing the static stop-start being met) to increase fuel economy and reduce vehicle emissions, and at vehicle speeds greater than the first threshold speed, a rolling stop-start may be utilized (in response to additional conditions for performing the rolling stop-start being met) to further increase fuel economy and reduce vehicle emissions compared with using the SSS technology alone. As a non-limiting example, the threshold speed may be in a range from 0.5 to 4.0 kph and may vary based on a configuration of the vehicle (e.g., manual versus automatic transmission).

If the vehicle speed is less than or equal to the first threshold speed, method 200 proceeds to 208 and includes determining if non-steering related static stop-start conditions are met. The non-steering related static stop-start conditions include conditions for initiating a static stop-start that are not related to steering parameters (steering wheel angle, steering applied torque, etc.). The non-steering related static stop-start conditions may include, for example, the brakes being applied, the engine operating at an idle speed, and the battery state of charge (SOC) being above a threshold SOC (e.g., at least 70%). The threshold SOC may be a non-zero SOC below which the battery may be unable to support electrical loads of the vehicle (e.g., vehicle lights, climate control, and electric power steering) while the engine is off and maintain enough power for restarting the engine. Further, the non-steering related static stop-start conditions may further include an indication that no non-steering static stop-start inhibits are present. The non-steering static stop-start inhibits may include, for example, an air conditioning system of the vehicle being in use. All of the non-steering related static stop-start conditions may be confirmed for the non-steering related static stop-start conditions to be considered met.

If the non-steering related static stop-start conditions are not met, method 200 proceeds to 220 and includes inhibiting static stop-start and maintaining engine operation. For example, fuel and spark will continue to be provided to the engine cylinders to produce combustion torque, and the engine will continue to be operated at a non-zero speed to provide the demanded torque. Method 200 may then return.

If the non-steering related static stop-start conditions are met, method 200 proceeds to 210 and includes determining if the steering angle is greater than zero. The steering angle refers to an angle of rotation of the steering wheel (e.g., as rotated by a vehicle operator), such as relative to a fixed point. As used herein, a steering angle greater than zero refers to a non-zero angle in either direction from a centered position of the steering wheel (e.g., centered position 143 shown in FIG. 1). If the steering angle is not greater than zero (e.g., the steering angle is equal to zero, indicating that the steering wheel is centered and not rotated), method 200 proceeds to 212 and includes using a pre-calibrated auto-stop steering torque threshold. The pre-calibrated auto-stop steering torque threshold is a non-zero steering torque value that is stored in a non-transitory memory of the controller and refers to a steering torque value above which stop-starts are inhibited while the engine is running (e.g., the engine will not be shut down for an auto-stop). As one non-limiting example, the pre-calibrated auto-stop steering torque threshold may be 4 Nm. The pre-calibrated auto-stop steering torque threshold may be calibrated during vehicle manufacture to ensure that the engine auto-stops when the customer is not maneuvering the steering wheel. For example, the pre-calibrated auto-stop steering torque threshold may be calibrated for a corresponding vehicle EPAS system torque that is low enough to indicate that the customer is not requesting significant steering current but not low enough to inhibit many auto-stops (e.g., greater than 25-50% of potential auto-stops).

Returning to 210, if the steering angle is greater than zero (e.g., the steering angle is equal to zero), method 200 proceeds to 214 and includes determining a steering torque threshold based on the steering angle and the pre-calibrated auto-stop steering torque threshold. That is, the torque threshold is adjusted from the pre-calibrated auto-stop steering torque threshold when the steering angle is greater than zero. For example, the controller may determine the steering torque threshold using a decay factor equation, such as by inputting the steering wheel angle and the pre-calibrated auto-stop steering torque threshold into one or more equations. As one non-limiting example, the controller may determine a decay rate of the steering torque currently applied by the vehicle operator using the equation:

$$\text{Decay\_Rate} = e^{-|(SWA*\pi)/(360*C)|}$$

where SWA is the steering angle (in degrees) and C is a calibrated factor. Then, the controller may determine the torque threshold as the product of the pre-calibrated auto-stop steering torque threshold (e.g., as defined at 212) and the determined decay rate, for example. As another example, the controller may input the steering wheel angle into a look-up table or graph and output the corresponding steering torque threshold for the input steering wheel angle. The look-up table or graph may include pre-populated steering torque threshold values based on the decay factor equation. An example graph will be described with respect to FIG. 3.

Whether the steering angle is equal to zero and the pre-calibrated auto-stop steering torque threshold is used (e.g., at 212) or the steering angle is non-zero and the steering torque threshold is determined (e.g., at 214), at 216, method 200 includes determining if the current steering applied torque is greater than the steering torque threshold. If the current steering applied torque is not greater than the steering torque threshold, method 200 proceeds to 218 and includes enabling a static stop-start and pulling down the engine. That is, with the steering applied torque less than the steering torque threshold, the static stop-start functionality is not inhibited by the EPAS system. Further, the additional, non-steering related conditions for performing the static stop-start are met (e.g., at 208). Pulling down the engine includes stopping fuel delivery to the engine so that combustion ceases and allowing the engine to spin down to rest. From 218, method 200 proceeds to 242, as will be described below.

If the current steering applied torque is greater than the steering torque threshold, method 200 proceeds to 220 and includes inhibiting static stop-start and maintaining engine operation, as described above. Thus, the engine will continue to be operated to support the EPAS system and provide vehicle maneuvering, even if the additional, non-steering related static start-stop conditions are met (e.g., at 208). Method 200 may then return so that the controller may continue to assess conditions and perform an auto-stop in response to conditions being met, such as in response to the steering applied torque decreasing below the steering torque threshold while the non-steering related static stop-start conditions are met.

Returning to 206, if the vehicle speed is not greater than or equal to the first threshold speed, method 200 proceeds to 222 and includes determining if non-steering related rolling stop-start conditions are met. The non-steering related rolling stop-start conditions include conditions for initiating a rolling stop-start that are not related to steering parameters (steering wheel angle, steering applied torque, etc.). The non-steering related rolling stop-start conditions may include all of the non-steering related static stop-start conditions (e.g., as defined at 208) and may further include the vehicle speed being less than a second threshold speed. The second threshold speed may be a non-zero speed that is higher than the first threshold speed defined above at 206. As a non-limiting example, the second threshold speed may be 12 kph. For example, at vehicle speeds above the second threshold speed, auto-stopping of the engine may be inhibited in order to maintain higher engine and vehicle speeds. All of the non-steering related rolling stop-start conditions may be confirmed for the non-steering related rolling stop-start conditions to be considered met.

If the non-steering related rolling stop-start conditions are not met, method 200 proceeds to 232 and includes inhibiting rolling stop-start and maintaining engine operation. Thus, the engine will continue to be operated at a non-zero speed based on the torque demand. Method 200 may then return.

If the non-steering related rolling stop-start conditions are met, method 200 proceeds to 224 and includes determining if the steering angle is greater than zero, as described above with respect to 210. If the steering angle is not greater than zero (e.g., the steering angle is equal to zero, indicating that the steering wheel is not rotated), method 200 proceeds to 226 and includes using the pre-calibrated auto-stop steering torque threshold. Thus, in the example of method 200, the pre-calibrated auto-stop steering torque threshold is the same whether the vehicle is preparing for a static stop-start or a rolling stop-start, but in other examples, the pre-calibrated auto-stop steering torque threshold may be different for performing a static stop-start and a rolling stop-start.

Returning to 224, if the steering angle is greater than zero (e.g., the steering angle is equal to zero), method 200 proceeds to 228 and includes determining a steering torque threshold based on the steering angle and the pre-calibrated auto-stop steering torque threshold. That is, the steering torque threshold may be adjusted from the pre-calibrated auto-stop steering torque threshold when the steering angle is greater than zero. For example, the controller may determine the steering torque threshold using a decay factor equation, such as by inputting the steering wheel angle and the pre-calibrated auto-stop steering torque threshold into one or more equations. As one non-limiting example, the controller may determine a decay rate of the steering torque currently applied by the vehicle operator using same equation as described above at 214. However, in other examples, the controller may use a different decay factor equation to determine the decay rate of the steering torque currently applied by the vehicle operator. Then, the controller may use the determined decay rate to determine the torque threshold by multiplying the calibrated rolling stop-start steering torque threshold by the decay rate, for example. As another example, the controller may input the steering wheel angle into a look-up table or graph and output the corresponding steering torque threshold for the input steering wheel angle.

Whether the steering angle is equal to zero and pre-calibrated auto-stop steering torque threshold is used (e.g., at 226) or the steering angle is non-zero and the steering torque threshold is determined (e.g., at 228), at 230, method 200 includes determining if the current steering applied torque is greater than the steering torque threshold. If the current steering applied torque is greater than the steering torque threshold, method 200 proceeds to 232 and includes inhibiting rolling stop-start and maintaining engine operation, as described above. Thus, the engine will continue to be operated to support the EPAS system and provide vehicle maneuvering. Following 232, method 200 may return so that the controller may continue to assess conditions and perform an auto-stop in response to conditions being met, such as in response to the steering applied torque decreasing below the steering torque threshold while the non-steering related rolling stop-start conditions are met.

Returning to 230, if the current steering applied torque is not greater than the steering torque threshold, method 200 proceeds to 234 and includes enabling a rolling stop-start and pulling down the engine. That is, with the steering applied torque less than the steering torque threshold, the rolling stop-start functionality is not inhibited. Pulling down the engine includes stopping fuel delivery to the engine so that combustion ceases and allowing the engine to spin down to rest.

At 236, method 200 includes determining if the vehicle speed is less than or equal to the first threshold speed (as defined above at 206). For example, while executing a rolling start-stop event and with the engine off, the vehicle speed may decrease. If the vehicle speed remains above the first threshold speed (e.g., is not less than or equal to the first threshold speed), method 200 proceeds to 238 and includes maintaining the rolling stop-start status. That is, the engine will remain shut down in the rolling start-stop event. If the vehicle speed reaches or decreases below the first threshold speed, method 200 proceeds to 240 and includes transitioning to a static stop-start status. Transitioning to the static stop-start status includes maintaining the engine shut down and adjusting a steering torque threshold for restarting the engine from that for a rolling stop-start event to that for a static stop-start event, as will be further described below.

Continuing to FIG. 2B, at 242, method 200 includes determining if non-steering related engine auto-start conditions are met. The non-steering related engine auto-start conditions include conditions for initiating an engine restart from an auto-stop that are not related to steering parameters. The non-steering related engine auto-start conditions may include, for example, the vehicle operator releasing the brake pedal, the vehicle operator tipping in, or the battery SOC dropping below the threshold SOC. In some examples, only one of the non-steering related engine auto-start conditions may be confirmed for the non-steering related engine auto-start conditions to be considered met and an engine restart to be initiated.

If the non-steering related engine auto-start conditions are met, method 200 proceeds to 254 and includes inhibiting auto stop-start (e.g., both rolling and static stop-starts) and restarting the engine. Restarting the engine may include, for example, cranking the engine to a non-zero speed with an electric motor (e.g., electric machine 52 of FIG. 1 or another dedicated starter motor) and initiating combustion in the engine cylinders via fuel delivery and spark. Following 254, method 200 may return.

If the non-steering related engine auto-start conditions are not met (e.g., none of the non-steering related engine auto-start conditions are confirmed), steering conditions are assessed to determining if the steering conditions are such to trigger engine pull up. Method 200 proceeds to 244 and includes determining if the steering angle when the engine was auto-stopped is greater than zero. If the steering angle when the engine was auto-stopped is not greater than zero (e.g., the steering angle was equal to zero), method 200 proceeds to 246 and includes using a pre-calibrated auto-start steering torque threshold. The pre-calibrated auto-start steering torque threshold may be different depending on whether the engine is auto-stopped during a static stop-start event or a rolling stop-start event. For example, the pre-calibrated auto-start steering torque threshold may be lower when the engine is auto-stopped in a rolling stop-start event than when the engine is auto-stopped in a static stop-start event. As a non-limiting example, the pre-calibrated auto-start steering torque threshold may be 6 nM when the engine is auto-stopped during a static stop-start event and 5 nM when the engine is auto-stopped during a running stop-start event. For example, friction is less while the vehicle is rolling (e.g., during a running stop-start) than while the vehicle is stopped (e.g., in a static stop-start), and thus, a lower torque threshold may be less for the running stop-start event. Further, the pre-calibrated auto-start steering torque threshold may be different than (e.g., greater than) the pre-calibrated auto-stop steering torque threshold for that vehicle EPAS system (e.g., as described above with respect to FIG. 2A). The pre-calibrated auto-start steering torque threshold may be an amount of steering applied torque above which the vehicle may be unable to provide or sustain steering assist while the engine is off, such as due to a high power draw of the EPAS system for steering applied torques above the pre-calibrated auto-start steering torque threshold.

Returning to 244, if the steering angle when the engine was auto-stopped is greater than zero, method 200 proceeds to 248 and includes determining the auto-start torque steering threshold based on the stop-start status (e.g., whether the engine is auto-stopped in a rolling stop-start or a static stop-start), the steering angle when the engine was stopped, and the pre-calibrated auto-start steering torque threshold for the corresponding stop-start status. That is, the auto-start steering torque threshold may be adjusted from the pre-calibrated auto-start steering torque threshold when the steering angle when the engine was auto-stopped is greater than zero. For example, the controller may determine the auto-start steering torque threshold using a decay factor equation, such as by inputting the steering wheel angle at engine shutdown and the pre-calibrated auto-start steering torque threshold for the appropriate stop-start status (e.g., SSS or RSS) into one or more equations. As one non-limiting example, the controller may determine a decay rate of the steering torque currently applied by the vehicle operator using same equation as described above at 214. However, in other examples, the controller may use a different decay factor equation to determine the decay rate of the steering torque currently applied by the vehicle operator. Then, the controller may use the determined decay rate to determine the auto-start steering torque threshold by multiplying the appropriate pre-calibrated auto-start steering torque threshold by the decay rate, for example. As another example, the controller may input the steering wheel angle at engine shutdown into a look-up table or graph and output the corresponding auto-start steering torque threshold for the input steering wheel angle. The look-up table or graph may include pre-populated auto-start steering torque threshold values based on the decay factor equation, as will be described with respect to FIG. 3.

Whether the steering angle when the engine was stopped is equal to zero and the pre-calibrated auto-start steering torque threshold is used for the corresponding stop-start status (e.g., at 246) or the steering angle is non-zero and the steering torque threshold is determined (e.g., at 248), at 250, method 200 includes determining if the current steering torque is greater than the steering torque threshold. If the current steering torque is not greater than the steering torque threshold, method 200 proceeds to 252 and includes maintaining the engine auto-stopped. Thus, the engine will remain off, without combustion occurring in engine cylinders. Following 252, method 200 may return so that the controller continues to assess operating conditions and initiates an engine restart in response to the steering applied torque increasing above the steering torque threshold and/or non-steering engine auto-start conditions being met. If the current steering torque is greater than the steering torque threshold, method 200 proceeds to 254 and includes inhibiting the auto stop-start functionality and restarting the engine, as described above. Following 254, method 200 returns.

Thus, in one example, method 200 of FIG. 2A includes operating in a first operating mode, wherein the engine is auto-stopped in a static stop-start. Operating in the first operating mode further includes operating with a steering applied torque greater than a first steering torque threshold as well as operating with the steering applied torque less than or equal to the first steering torque threshold. In response to operating with the steering applied torque greater than the first steering torque threshold while operating in the first operating mode, engine stop-start is inhibited and the engine is auto-started. In response to operating with the steering applied torque less than or equal to the first steering torque threshold while operating in the first operating mode, engine stop-start is enabled and the engine remains shut down. Further, while operating in the first operating mode, the first steering torque threshold is adjusted based on steering wheel angle.

In another example, method 200 of FIG. 2A includes operating in a second operating mode, wherein the engine is auto-stopped in a rolling stop-start. Operating in the second operating mode further includes operating with the steering applied torque greater than a second steering torque threshold, which is less than the first steering torque threshold, as well as operating with the steering applied torque less than or equal to the second steering torque threshold. In response to operating with the steering applied torque greater than the second steering torque threshold while operating in the second operating mode, engine stop-start is inhibited and the engine is auto-started. In response to operating with the steering applied torque less than or equal to the second steering torque threshold while operating in the second operating mode, engine stop-start is enabled and the engine remains shut down. Further, while operating in the second operating mode, the second steering torque threshold is adjusted based on the steering wheel angle.

In still another example, method 200 of FIG. 2A includes operating in a third operating mode, wherein the engine is running. Operating in the third operating mode further includes operating with the steering applied torque greater than a third steering torque threshold, which is less than the first steering torque threshold and the second steering torque threshold, as well as operating with the steering applied torque less than or equal to the third steering torque threshold. In response to operating with the steering applied torque greater than a third steering torque threshold while operating in the third operating mode, engine stop-start is inhibited and the engine maintained running. In response to operating with the steering applied torque less than or equal to the third steering torque threshold while operating in the third operating mode, engine stop-start is enabled. Further, while operating in the third operating mode, the third steering torque threshold is adjusted based on the steering wheel angle.

Further, one of the first operating mode, the second operating mode, and the third operating mode is present while the engine is operated. The first operating mode, the second operating mode, and the third operating mode are different and exclusive, such that only one of the first operating mode, the second operating mode, and the third operating mode is present at a given time during engine operation. For example, the controller may select between the first operating mode, the second operating mode, and the third operating mode based on the vehicle speed and whether the engine is on or auto-stopped.

In this way, the steering torque threshold for inhibiting auto stop-start is varied based on operating conditions, which may decrease an amount of operator effort for initiating a restart while also decreasing premature restarts and stop-start inhibitions. By adjusting different pre-calibrated thresholds based on whether the engine is running, auto-stopped in a static-stop start event, or auto-stopped in a rolling stop-start event, a steering assist demand may be more accurately predicted. Overall, vehicle fuel economy may be increased and vehicle emissions decreased by decreasing an amount of engine idle time.

Next, FIG. 3 shows an example graph 300 of a steering torque threshold for inhibiting auto stop-start of an engine (e.g., engine 10 of FIG. 1) with respect to steering angle (e.g., a rotational angle of steering wheel 137 of FIG. 1, such as measured by SWA sensor 139 of FIG. 1). Graph 300 may be stored in a memory of a controller, such as controller 12 and/or controller 102 of FIG. 1, for determining the torque threshold for inhibiting auto-stop based on the steering angle. Plot 302 of graph 300 (solid line) shows a steering torque threshold for inhibiting auto stop-start while the engine is on, plot 304 of graph 300 (dashed line) shows a steering torque threshold for inhibiting auto stop-start while the engine is auto-stopped in a rolling stop-start, and plot 306 of graph 300 (dot-dashed line) shows a steering torque threshold for inhibiting auto stop-start while the engine is auto-stopped in a static stop-start. The horizontal axis of graph 300 represents the steering angle (e.g., in degrees), with a value of the steering angle increasing along the horizontal axis from left to right, and the vertical axis of graph 300 represents the steering torque threshold (e.g., in Nm), with a value of the steering torque threshold increasing along the vertical axis from bottom to top.

In the example of graph 300, the steering torque threshold for inhibiting auto stop-start while the engine is on (plot 302) is lower than the steering torque threshold for inhibiting auto stop-start while the engine is auto-stopped in a rolling stop-start (plot 304), which is in turn lower than the steering torque threshold for inhibiting auto stop-start while the engine is auto-stopped in a static stop-start (plot 306), across the entire steering range (e.g., from 0 degrees to 360 degrees). As described above with respect to FIGS. 2A and 2B, the relationship between the steering torque threshold and the steering angle for each of plots 302, 304, and 306 may be defined by a decay factor equation, which may be the same decay factor equation or a different decay factor equation for each of plots 302, 304, and 306. As a result, for each of plots 302, 304, and 306, as the steering angle increases, the steering torque threshold decreases. Further, at least in some examples, the steering torque threshold for each of plots 302, 304, and 306 at a steering angle of zero may be equal to a corresponding pre-calibrated steering torque threshold, which is different for each of plots 302, 304, and 306 in the example of FIG. 3 (e.g., a first pre-calibrated steering torque threshold is selected when the engine is running, a second pre-calibrated steering torque threshold is selected when the engine is auto-stopped in a rolling stop-start, and a third pre-calibrated steering torque threshold is selected when the engine is auto-stopped in a static stop start). Thus, the pre-calibrated steering torque thresholds may be adjusted using the decay factor equation to produce each of plots 302, 304, and 306.

As an illustrative example, at a first steering angle SWA1, the steering torque threshold for inhibiting auto stop-start of the engine while the engine is on (e.g., with combustion occurring in engine cylinders) is equal to a torque value $THR1_{on}$. For example, the controller may reference plot 302 of graph 300 by inputting SWA1 and outputting $THR1_{on}$. Therefore, while the steering wheel is held at SWA1, if a steering applied torque (e.g., as measured by steering torque sensor 141 of FIG. 1) is greater than $THR1_{on}$, auto stop-start of the engine is inhibited, and the engine will remain on even if other conditions for auto-stopping the engine are met (e.g., as described above with respect to 208 and 222 of FIG. 2A). On the other hand, while the steering wheel is held at SWA1, if the steering applied torque is less than or equal to $THR1_{on}$, auto stop-start of the engine is enabled, and the engine will be pulled down in response to the other conditions for auto-stopping the engine being met (e.g., as described above with respect to 218 and 234 of FIG. 2A).

The steering torque threshold for inhibiting auto stop-start when the engine is auto-stopped (e.g., without combustion occurring in engine cylinder) in a rolling stop-start at the first steering angle SWA1 is equal to a torque value $THR1_{RSS}$, which is higher than $THR1_{on}$. Therefore, it takes a greater amount of steering applied torque to inhibit auto stop-start when the engine is auto-stopped in a rolling stop-start compared to when the engine is on. The controller may reference plot 304 of graph 300 by inputting SWA1 and outputting $THR1_{RSS}$, for example. When the engine is pulled down in a rolling stop-start with the steering wheel at SWA1, if the steering applied torque exceeds $THR1_{RSS}$, auto stop-start of the engine is inhibited, and the engine will be restarted even if other conditions for auto-stopping the engine are met (e.g., as described above with respect to 254 of FIG. 2B). If instead the steering applied torque remains less than or equal to $THR1_{RSS}$ while the engine is auto-stopped in the rolling stop-start, auto stop-start of the engine is enabled, and the engine will remain off in response to the other conditions for auto-stopping the engine remaining met (e.g., as described above with respect to 252 of FIG. 2B).

The steering torque threshold for inhibiting auto stop-start when the engine is auto-stopped in a static stop-start at the first steering angle SWA1 is equal to a torque value $THR1_{SSS}$, which is higher than $THR1_{on}$ and $THR1_{RSS}$. Therefore, it takes a greater amount of steering applied torque to inhibit auto stop-start when the engine is auto-stopped in a static stop-start compared to when the engine is on and compared to when the engine is auto-stopped in a rolling stop-start. The controller may reference plot 306 of graph 300 by inputting SWA1 and outputting $THR1_{SSS}$, for example. When the engine is pulled down in a static stop-start with the steering wheel at SWA1, if the steering applied torque exceeds $THR1_{SSS}$, auto stop-start of the engine is inhibited, and the engine will be restarted even if other conditions for auto-stopping the engine are met (e.g., as described above with respect to 254 of FIG. 2B). If the steering applied torque remains less than or equal to $THR1_{SSS}$ while the engine is auto-stopped in the static stop-start, auto stop-start of the engine is enabled, and the engine will remain off in response to the other conditions for auto-stopping the engine remaining met (e.g., as described above with respect to 252 of FIG. 2B).

As another illustrative example, at a second, higher steering angle SWA2, the steering torque threshold for inhibiting auto stop-start of the engine while the engine is on is equal to a torque value $THR2_{on}$, which is lower than $THR1_{on}$. Similarly, the steering torque threshold for inhibiting auto stop-start when the engine is auto-stopped in a rolling stop-start is equal to a torque value $THR2_{RSS}$, which is less than $THR1_{RSS}$, and the steering torque threshold for inhibiting auto stop-start when the engine is auto-stopped in a static stop-start is equal to a torque value $THR2_{SSS}$, which is less than $THR1_{SSS}$. Thus, a smaller amount of steering applied torque will lead to auto stop-start being inhibited at SWA2 than at SWA1. As an example, when the engine is on, 2 Nm of steering applied torque at SWA1 enables auto stop-start (e.g., 2 Nm is less than $THR1_{on}$ in the example of graph 300), whereas 2 Nm of steering applied torque at SWA2 inhibits auto stop-start (e.g., 2 Nm is greater than $THR2_{on}$ in the example of graph 300). As another example, when the engine is auto-stopped in a static start-stop, 2 Nm of steering applied torque at both SWA1 and SWA2 enables auto stop-start. Thus, the steering torque threshold for inhibiting auto stop-start of the engine varies based on the steering wheel angle and the engine status, such as whether the engine is on, auto-stopped in a rolling start-stop, or auto-stopped in a static stop-start. By varying the steering torque threshold for inhibiting auto-stop start based on the steering wheel angle and the engine status, steering assist demand is more accurately predicted. Further, the system can provide a dynamic response to varying customer inputs.

FIG. 4 shows an example timeline 400 for enabling or inhibiting stop-start of a vehicle engine (e.g., engine 10 of FIG. 1) based on an amount of steering applied torque relative to a torque threshold. For example, a controller (e.g., controller 12 and/or controller 102 of FIG. 1) may determine the torque threshold based on an angle of a steering wheel (e.g., steering wheel 137 of FIG. 1) and an engine status (e.g., condition), such as according to the example method 200 of FIGS. 2A and 2B. As an example, a vehicle operator may apply torque to the steering wheel, thereby adjusting the steering wheel angle. Vehicle speed is shown in plot 402, engine status is shown in plot 404, steering wheel angle is shown in plot 406, steering applied torque is shown in plot 408, an indication of whether non-steering related conditions for performing an auto-stop are met is shown in plot 410, and an indication of whether stop-start is inhibited by the steering applied torque is shown in plot 412. For all of the above, the horizontal axis represents time, with time increasing along the horizontal axis from left to right. The vertical axis represents each labeled parameter. For plots 402, 406, and 408, a value of the labeled parameter increases along the vertical axis from bottom to top. For plot 404, the vertical axis represents whether the engine status is on (e.g., operating at a non-zero speed, with combustion occurring in engine cylinders) or auto-stopped (e.g., shut down, without combustion occurring in the engine cylinders, while the vehicle remains on during a drive cycle), as labeled. For plot 410, the vertical axis represents whether the non-steering related conditions for performing the auto-stop are met (e.g., "yes" or "no," as labeled). The non-steering related auto-stop conditions are described above with respect to method 200 of FIGS. 2A-2B. For plot 412, the vertical axis represents whether stop-start is inhibited by the steering applied torque (e.g., "yes" or "no," as labeled). Furthermore, a first, lower vehicle speed threshold is indicated by dashed line 401, below which a static stop-start may be executed; a second, higher vehicle speed threshold is shown by dashed line 403, below which a rolling stop-start may be executed; and a steering torque threshold is shown by dashed line 409, above which the steering applied torque inhibits stop-start of the engine.

At time t1, the engine is auto-stopped (plot 404), with non-steering related auto-stop conditions met (plot 410) and no steering-related stop-start inhibition (plot 412). Because the vehicle speed is zero (plot 402), which is less than the first vehicle speed threshold (dashed line 401), the stop-start event is a static stop-start event. Further, the engine was auto-stopped with the steering wheel angle equal to zero (plot 406), and so the steering torque threshold (dashed line 409) is equal to a pre-calibrated threshold for a static stop-start. Further still, the steering applied torque is equal to zero (plot 408) and is less than the steering torque threshold (dashed line 409), resulting in the steering torque not inhibiting stop-start of the engine (plot 412).

Shortly before time t2, the vehicle operator begins to sharply turn the steering wheel, resulting in the steering wheel angle rapidly increasing (plot 406) due to a high steering applied torque (plot 408). At time t2, the steering applied torque (plot 406) surpasses the steering torque threshold (dashed line 409). In response, the steering torque inhibits stop-start of the engine (plot 412). Even though non-steering related conditions for the static stop-start continue to be met at time t2 (plot 410), the engine is restarted (plot 404) so that an electric steering system (e.g., electric steering system 70 of FIG. 1) can provide steering assistance without draining a system battery (e.g., system battery 58 of FIG. 1).

Shortly after time t2, the vehicle operator tips in, resulting in the vehicle speed increasing (plot 402). Due to the torque demand, the non-steering related conditions for stop-start are no longer met (plot 410), but the engine is already on due to the steering torque-initiated engine pull up at time t2. Between time t2 and time t3, the steering torque threshold (dashed line 409) is adjusted based on a pre-calibrated steering torque threshold for a running engine (which is lower than the pre-calibrated steering torque threshold for a static stop-start) and the steering wheel angle (plot 406), with the steering torque threshold generally decreasing as the steering wheel angle increases.

The steering applied torque (plot 408) remains above the steering torque threshold (dashed line 409) until time t3. At time t3, in response to the steering applied torque (plot 408) decreasing below the steering torque threshold (dashed line 409), the steering torque no longer inhibits stop-start of the engine (plot 412). However, the non-steering related conditions for performing a stop-start continue to not be met between time t3 and time t4 (plot 410). For example, the vehicle speed (plot 402) is greater than the second threshold vehicle speed (dashed line 403), and as such, a rolling stop-start cannot be performed even though the steering applied torque (plot 408) remains below the steering torque threshold (plot 409) as the steering wheel angle (plot 409) is adjusted to maneuver the vehicle.

The vehicle begins to decelerate (as shown in plot 402), such as due to the vehicle operator depressing a brake pedal (e.g., brake pedal 133 of FIG. 1), and at time t4, the vehicle speed decreases below the second vehicle speed threshold (dashed line 405). As a result, a rolling stop-start is enabled, and the non-steering related conditions for performing an auto-stop are met (plot 410). Furthermore, the steering wheel angle (plot 406) and the steering applied torque (plot 409) are both equal to zero, making the steering applied torque less than the steering torque threshold (dashed line 409). As a result, the steering torque does not inhibit stop-start of the engine (plot 412).

In response to the non-steering related conditions for performing an auto-stop being met and no steering torque-related stop-start inhibition, at time t4, the engine is pulled down for a stop-start event (plot 404). Because the vehicle speed (plot 402) is greater than the first threshold vehicle speed (dashed line 401), the stop-start event is a rolling stop-start event, and with the steering wheel angle equal to zero (plot 406), the steering torque threshold (dashed line 409) is adjusted to a pre-calibrated steering torque threshold for a rolling stop-start. The pre-calibrated steering torque threshold for a rolling stop-start is greater than the pre-calibrated steering torque threshold for a running engine and less than the pre-calibrated steering torque threshold for a static stop-start.

The vehicle continues to decelerate, and at time t5, the vehicle speed (plot 402) decreases below the first threshold vehicle speed (dashed line 401). In response, the stop-start event is transitioned to a static stop-start event, and the steering torque threshold (dashed line 409) is increased to the pre-calibrated steering torque threshold for a static stop-start.

At time t6, the vehicle operator tips in. As a result, the non-steering related auto-stop conditions are no longer met (plot 410), and the engine is restarted (plot 404). The steering torque threshold (dashed line 409) is adjusted to the pre-calibrated steering torque threshold for a running engine while the steering wheel angle remains at zero (plot 406). With the steering applied torque (plot 408) remaining less than the steering torque threshold (dashed line 409), the steering torque does not inhibit stop-start of the engine (plot 412).

Shortly before time t7, the vehicle operator begins to apply torque to the steering wheel (plot 408) to rotate the steering wheel to a non-zero angle (plot 406), such as to execute a vehicle turn. The steering torque threshold (plot 409) is adjusted based on the steering wheel angle (plot 406), with the steering torque threshold decreasing from the pre-calibrated steering torque threshold for a running engine as the steering wheel angle increases. At time t7, the steering applied torque (plot 408) surpasses the steering torque threshold (dashed line 409). As a result, the steering torque inhibits start-stop of the engine (plot 412).

Shortly before time t8, the vehicle speed decreases (plot 402) due to the vehicle operator applying the brakes. With the vehicle speed less than the second threshold vehicle speed (dashed line 403), the non-steering related auto-stop conditions are met (plot 410). However, stop-start of the engine continues to be inhibited by the steering torque (plot 412) due to the steering applied torque (plot 408) remaining above the steering torque threshold (dashed line 409). At time t8, the steering applied torque (plot 408) decreases below the steering torque threshold (dashed line 409). In response, at time t8, the engine is pulled down (plot 404) for a rolling stop-start event. With the engine auto-stopped in the rolling stop-start event, the steering torque threshold (dashed line 409) is adjusted as a function of the pre-calibrated steering torque threshold for a rolling stop-start and the steering wheel angle at which the engine was shut down. Since the steering wheel angle at time t8 is relatively high, the steering torque threshold between time t8 and time t9 is lower than the pre-calibrated steering torque threshold for a rolling stop-start (e.g., between time t4 and time t5).

At time t9, the engine transitions to a static stop-start event as the vehicle speed (plot 402) decreases below the first threshold vehicle speed (dashed line 401). As a result, the controller adjusts the steering torque threshold (dashed line 409) based on the pre-calibrated steering torque threshold for a static stop-start and the steering wheel angle at which the engine was shut down (e.g., at time t8). The resulting steering torque threshold at time t9 is greater than at prior to time t9 (e.g., between time t8 and time t9), when the rolling stop-start event was present, but is less than the pre-calibrated steering torque threshold for a static stop-start (e.g., between time t5 and time t6) due to the relatively high steering wheel angle when the engine was shut down at time t8.

In this way, a controller may continuously adjust a steering torque threshold as operating conditions, including engine status (e.g., on, auto-stopped in a rolling stop-start event, or auto-stopped in a static stop-start event) and a steering wheel angle change in order to anticipate operator demand and provide electric steering assist. For example, less steering applied torque may result in stop-start inhibition at higher steering wheel angles, preventing the engine from auto-stopping and enabling faster engine restarts at higher steering wheel angles, and enabling engine auto-stops and reducing premature engine restarts at lower steering wheel angles compared with using a constant steering torque threshold. By accurately anticipating steering assist demands, engine idle time may be reduced and fuel economy may be increased (e.g., by decreasing overestimation of steering assist demands) and steering assist hesitation may be decreased (e.g., by decreasing underestimation of steering assist demands).

The technical effect of adjusting a steering torque threshold for inhibiting engine stop-start based on a steering wheel angle is that a non-linear hysteresis is provided, thereby decreasing both engine idle time and steering system hesitation.

In one example, a method, comprises: while a vehicle engine is running, applying a first steering torque threshold, based on a steering wheel angle, for inhibiting engine stop-start; and while the engine is auto-stopped, applying a second steering torque threshold for inhibiting the engine stop-start, the second steering torque threshold based on the steering wheel angle and whether the engine is auto-stopped in a static stop-start status or a rolling stop-start status. In the preceding example, additionally or optionally, the method further comprises: inhibiting the engine stop-start and maintaining the engine running in response to a steering applied torque greater than the first steering torque threshold while the engine is running; and enabling the engine stop-start in response to the steering applied torque being less than or equal to the first steering torque threshold while the engine is running. In any or all of the preceding examples, additionally or optionally, enabling the engine stop-start includes pulling down the engine in response to additional stop-start conditions being met. In any or all of the preceding examples, the method additionally or optionally further comprises inhibiting the engine stop-start and restarting the engine in response to a steering applied torque greater than the second steering torque threshold while the engine is auto-stopped; and enabling the engine stop-start and maintaining the engine auto-stopped in response to the steering applied torque being less than or equal to the second steering torque threshold while the engine is auto-stopped. In any or all of the preceding examples, additionally or optionally, applying the first steering torque threshold for inhibiting the engine stop-start comprises: using a first pre-calibrated steering torque threshold as the first steering torque threshold when the steering wheel angle is zero; and determining the first steering torque threshold as a function of the first pre-calibrated steering torque threshold and a decay rate, the decay rate determined as a function of the steering wheel angle, when the steering wheel angle is non-zero. In any or all of the preceding examples, additionally or optionally, the first steering torque threshold decreases as the steering wheel angle increases. In any or all of the preceding examples, additionally or optionally, applying the second steering torque threshold for inhibiting the engine stop-start comprises: using a second pre-calibrated steering torque threshold as the second steering torque threshold when the steering wheel angle is zero and the engine is auto-stopped in the static stop-start status; determining the second steering torque threshold as a function of the second pre-calibrated steering torque threshold and the decay rate when the steering wheel angle is non-zero and the engine is auto-stopped in the static stop-start status; using a third pre-calibrated steering torque threshold as the second steering torque threshold when the steering wheel angle is zero and the engine is auto-stopped in the rolling stop-start status; and determining the second steering torque threshold as a function of the third pre-calibrated steering torque threshold and the decay rate when the steering wheel angle is non-zero and the engine is auto-stopped in the rolling stop-start status. In any or all of the preceding examples, additionally or optionally, the second steering torque threshold decreases as the steering wheel angle increases. In any or all of the preceding examples, additionally or optionally, the first pre-calibrated steering torque threshold is less than each of the second pre-calibrated steering torque threshold and the third pre-calibrated steering torque threshold, and the third pre-calibrated steering torque threshold is less than the second pre-calibrated steering torque threshold. In any or all of the preceding examples, the method additionally or optionally further comprises operating the vehicle with the engine auto-stopped, and during the operating the vehicle with the engine auto-stopped: selecting the static stop-start status in response to a speed of the vehicle being less than or equal to a threshold speed; selecting the rolling stop-start status in response to the vehicle speed being greater than the threshold speed; and transitioning from the rolling stop-start status to the static stop-start status in response to the vehicle speed reaching or decreasing below the threshold speed while operating in the rolling stop-start status.

As another example, a method for an engine comprises, during a first auto-stop event of the engine, inhibiting stop-start in response to a steering applied torque exceeding a first threshold torque; and during a second auto-stop event of the engine, determining a second threshold torque as a function of the first threshold torque and a steering wheel angle at which the engine is auto-stopped, and inhibiting stop-start in response to the steering applied torque exceeding the second threshold torque. In the preceding example, additionally or optionally, the first auto-stop event includes the steering wheel angle at which the engine is auto-stopped being at or below a threshold angle, and the second auto-stop event includes the steering wheel angle at which the engine is auto-stopped being above the threshold angle. In any or all of the preceding examples, additionally or optionally, determining the second threshold torque as a function of the first threshold torque and the steering wheel angle at which the engine is auto-stopped includes determining a decay rate of the steering applied torque based on the steering wheel angle at which the engine is auto-stopped and multiplying the first threshold torque by the decay rate. In any or all of the preceding examples, additionally or optionally, both of the first auto-stop event and the second auto-stop event are either a static stop-start or a rolling stop-start, and the first threshold torque is higher for a static stop-start compared with a rolling stop-start. In any or all of the preceding examples, the method additionally or optionally further comprises, during engine running with the steering wheel angle at or below a threshold angle, inhibiting stop-start in response to the steering applied torque exceeding a third threshold torque; and during engine running with the steering wheel angle greater than the threshold angle, determining a fourth threshold torque as a function of the third threshold torque and the steering wheel angle, and inhibiting stop-start in response to the steering applied torque exceeding the fourth threshold torque. In any or all of the preceding examples, additionally or optionally, the third threshold torque is less than the first threshold torque.

As another example, a system for a vehicle comprises: an engine configured to propel the vehicle via combustion of fuel and air; a steering wheel configured to turn vehicle wheels; and a controller with executable instructions stored on non-transitory memory that, when executed, cause the controller to: inhibit or enable automatic stopping and starting of the engine based on an amount of torque applied to the steering wheel relative to a torque threshold; and determine the torque threshold based on vehicle speed, current engine status, and an angle of the steering wheel. In the preceding example, the system additionally or optionally further comprises a steering wheel angle sensor coupled to the steering wheel and configured to output the angle of the steering wheel to the controller, a steering applied torque sensor coupled to the steering wheel and configured to output the amount of torque applied to the steering wheel to the controller, and the controller stores further executable instructions on non-transitory memory that, when executed cause the controller to: inhibit automatic stopping and starting of the engine and restart the engine in response to the amount of torque applied to the steering wheel surpassing the torque threshold while the engine is auto-stopped; inhibit automatic stopping and starting of the engine and maintain the engine operating in response to the amount of torque applied to the steering wheel surpassing the torque threshold while the engine is operating; enable automatic stopping and starting of the engine and maintain the engine off in response to the amount of torque applied to the steering wheel being less than or equal to the torque threshold while the engine is auto-stopped; and enable automatic stopping and starting of the engine and auto-stop the engine in response to the amount of torque applied to the steering wheel being less than or equal to the torque threshold while the engine is operating. In any or all of the preceding examples, additionally or optionally, the current engine status is one of operating and auto-stopped. In any or all of the preceding examples, additionally or optionally, the instructions that cause the controller to determine the torque threshold based on the vehicle speed, the current engine status, and the angle of the steering wheel include further executable instructions stored on non-transitory memory that, when executed, cause the controller to: select a first pre-calibrated torque threshold when the engine status is operating; select a second pre-calibrated torque threshold when the engine status is auto-stopped and the vehicle speed is less than or equal to a threshold speed; select a third pre-calibrated torque threshold when the engine status is auto-stopped and the vehicle speed is greater than the threshold speed; and adjust the selected pre-calibrated torque threshold as a function of the angle of the steering wheel.

In another representation, a method for a vehicle engine comprises: in a first operating mode, inhibiting engine stop-start in response to a steering applied torque surpassing a first steering torque threshold; in a second operating mode, inhibiting the engine stop-start in response to the steering applied torque surpassing a second steering torque threshold; in a third operating mode, inhibiting the engine stop-start in response to the steering applied torque surpassing a third steering torque threshold; and adjusting each of the first steering torque threshold, the second steering torque threshold, and the third steering torque threshold based on steering wheel angle. In the preceding example, additionally or optionally, the first operating mode, the second operating mode, and the third operating mode are different and exclusive. In any or all of the preceding examples, additionally or optionally, the second steering torque threshold is less than the first steering torque threshold, and the third steering torque threshold is less than the first steering torque threshold and the second steering torque threshold. In any or all of the preceding examples, additionally or optionally, the first operating mode includes the engine auto-stopped in a static stop-start, the second operating mode includes the engine auto-stopped in a rolling stop-start, and the third operating mode includes the engine running. In any or all of the preceding examples, additionally or optionally, adjusting each of the first steering torque threshold, the second steering torque threshold, and the third steering torque threshold based on the steering wheel angle includes decreasing each of the first steering torque threshold, the second steering torque threshold, and the third steering torque threshold as the steering wheel angle increases. In any or all of the preceding examples, additionally or optionally, decreasing each of the first steering torque threshold, the second steering torque threshold, and the third steering torque threshold as the steering wheel angle increases includes: selecting the first steering torque threshold when the first operating mode is present; selecting the second steering torque threshold when the second operating mode is present; selecting the third steering torque threshold when the third operating mode is present; and multiplying the selected steering torque threshold by a decay rate, the decay rate determined as a function of the steering wheel angle. In any or all of the preceding examples, additionally or optionally, the function is an exponential decay function. In any or all of the preceding examples, additionally or optionally, one of the first operating mode, the second operating mode, and the third operating mode is present during a drive cycle of the vehicle, and the method further comprises operating in one of the first operating mode, the second operating mode, and the third operating mode. In any or all of the preceding examples, additionally or optionally, the inhibiting the engine stop-start includes restarting the engine while operating in one of the first operating mode and the second operating mode and preventing engine auto-stop while operating in the third operating mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   determining a steering wheel angle;
   determining a first steering torque thresholds as a function of a first pre-calibrated steering torque threshold and a decay rate, the decay rate determined as a function of the steering wheel angle, when the steering wheel angle is non-zero;
   while a vehicle engine is running, applying the first steering torque threshold, based on the steering wheel angle, for inhibiting engine stop-start, including using the first pre-calibrated steering torque threshold as the first steering torque threshold when the steering wheel angle is zero; and
   while the engine is auto-stopped, applying the second steering torque threshold for inhibiting the engine stop-start, the second steering torque threshold determined based on the steering wheel angle and whether the engine is auto-stopped in a static stop-start status or a rolling stop-start status.

2. The method of claim 1, further comprising:
   inhibiting the engine stop-start and maintaining the engine running in response to a steering applied torque greater than the first steering torque threshold while the engine is running; and
   enabling the engine stop-start in response to the steering applied torque being less than or equal to the first steering torque threshold while the engine is running.

3. The method of claim 2, wherein enabling the engine stop-start includes pulling down the engine in response to additional stop-start conditions being met.

4. The method of claim 1, further comprising:
   inhibiting the engine stop-start and restarting the engine in response to a steering applied torque greater than the second steering torque threshold while the engine is auto-stopped; and
   enabling the engine stop-start and maintaining the engine auto-stopped in response to the steering applied torque being less than or equal to the second steering torque threshold while the engine is auto-stopped.

5. The method of claim 1, wherein the first steering torque threshold decreases as the steering wheel angle increases.

6. The method of claim 1, wherein applying the second steering torque threshold for inhibiting the engine stop-start comprises:
   using a second pre-calibrated steering torque threshold as the second steering torque threshold when the steering wheel angle is zero and the engine is auto-stopped in the static stop-start status;
   determining the second steering torque threshold as a function of the second pre-calibrated steering torque threshold and the decay rate when the steering wheel angle is non-zero and the engine is auto-stopped in the static stop-start status;
   using a third pre-calibrated steering torque threshold as the second steering torque threshold when the steering wheel angle is zero and the engine is auto-stopped in the rolling stop-start status; and
   determining the second steering torque threshold as a function of the third pre-calibrated steering torque threshold and the decay rate when the steering wheel angle is non-zero and the engine is auto-stopped in the rolling stop-start status.

7. The method of claim 6, wherein the second steering torque threshold decreases as the steering wheel angle increases.

8. The method of claim 6, wherein the first pre-calibrated steering torque threshold is less than each of the second pre-calibrated steering torque threshold and the third pre-calibrated steering torque threshold, and the third pre-calibrated steering torque threshold is less than the second pre-calibrated steering torque threshold.

9. The method of claim 1, further comprising operating the vehicle with the engine auto-stopped, and during the operating the vehicle with the engine auto-stopped:
   selecting the static stop-start status in response to a speed of the vehicle being less than or equal to a threshold speed;
   selecting the rolling stop-start status in response to the vehicle speed being greater than the threshold speed; and
   transitioning from the rolling stop-start status to the static stop-start status in response to the vehicle speed reaching or decreasing below the threshold speed while operating in the rolling stop-start status.

10. A method for a vehicle engine, comprising:
determining a steering wheel angle and a first threshold torque;
during a first auto-stop event of the engine, inhibiting a stop-start engine shutdown in response to a steering applied torque exceeding the first threshold torque; and
during a second auto-stop event of the engine, determining a second threshold torque as a function of the first threshold torque and the steering wheel angle at which the engine is auto-stopped, and inhibiting stop-start engine shutdown in response to the steering applied torque exceeding the second threshold torque, wherein the first auto-stop event includes the steering wheel angle at which the engine is auto-stopped being at or below a threshold angle, and the second auto-stop event includes the steering wheel angle at which the engine is auto-stopped being above the threshold angle.

11. The method of claim 10, wherein determining the second threshold torque as a function of the first threshold torque and the steering wheel angle at which the engine is auto-stopped includes determining a decay rate of the steering applied torque based on the steering wheel angle at which the engine is auto-stopped and multiplying the first threshold torque by the decay rate.

12. The method of claim 10, wherein both of the first auto-stop event and the second auto-stop event are either a static stop-start or a rolling stop-start, and the first threshold torque is higher for a static stop-start compared with a rolling stop-start.

13. The method of claim 10, further comprising:
during engine running with the steering wheel angle at or below a threshold angle, inhibiting stop-start in response to the steering applied torque exceeding a third threshold torque; and
during engine running with the steering wheel angle greater than the threshold angle, determining a fourth threshold torque as a function of the third threshold torque and the steering wheel angle, and inhibiting stop-start in response to the steering applied torque exceeding the fourth threshold torque.

14. The method of claim 13, wherein the third threshold torque is less than the first threshold torque.

15. A system for a vehicle, comprising:
an engine configured to propel the vehicle via combustion of fuel and air;
a steering wheel configured to turn vehicle wheels; and
a controller with executable instructions stored on non-transitory memory that, when executed, cause the controller to:
inhibit or enable automatic stopping and starting of the engine based on an amount of torque applied to the steering wheel relative to a torque threshold; and
determine the torque threshold based on vehicle speed, current engine status, and an angle of the steering wheel;
wherein the current engine status is one of operating and auto-stopped; and
wherein the instructions that cause the controller to determine the torque threshold based on the vehicle speed, the current engine status, and the angle of the steering wheel include further executable instructions stored on non-transitory memory that, when executed, cause the controller to:
select a first pre-calibrated torque threshold when the engine status is operating;
select a second pre-calibrated torque threshold when the engine status is auto-stopped and the vehicle speed is less than or equal to a threshold speed;
select a third pre-calibrated torque threshold when the engine status is auto-stopped and the vehicle speed is greater than the threshold speed; and
adjust the selected pre-calibrated torque threshold as a function of the angle of the steering wheel.

16. The system of claim 15, further comprising a steering wheel angle sensor coupled to the steering wheel and configured to output the angle of the steering wheel to the controller, a steering applied torque sensor coupled to the steering wheel and configured to output the amount of torque applied to the steering wheel to the controller, and wherein the controller stores further executable instructions on non-transitory memory that, when executed cause the controller to:
inhibit automatic stopping and starting of the engine and restart the engine in response to the amount of torque applied to the steering wheel surpassing the torque threshold while the engine is auto-stopped;
inhibit automatic stopping and starting of the engine and maintain the engine operating in response to the amount of torque applied to the steering wheel surpassing the torque threshold while the engine is operating;
enable automatic stopping and starting of the engine and maintain the engine off in response to the amount of torque applied to the steering wheel being less than or equal to the torque threshold while the engine is auto-stopped; and
enable automatic stopping and starting of the engine and auto-stop the engine in response to the amount of torque applied to the steering wheel being less than or equal to the torque threshold while the engine is operating.

* * * * *